(12) United States Patent
Handly et al.

(10) Patent No.: US 9,756,480 B1
(45) Date of Patent: *Sep. 5, 2017

(54) PREDICTIVE ANALYTICS UTILIZING PROXIMITY DETERMINATION

(71) Applicants: Brian Handly, Raleigh, NC (US); Jared Dean, Raleigh, NC (US); Matthew Davis, Raleigh, NC (US)

(72) Inventors: Brian Handly, Raleigh, NC (US); Jared Dean, Raleigh, NC (US); Matthew Davis, Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/059,058

(22) Filed: Mar. 2, 2016

(51) Int. Cl.
| | | |
|---|---|---|
| *H04W 24/00* | (2009.01) | |
| *H04W 4/04* | (2009.01) | |
| *G06N 7/00* | (2006.01) | |
| *H04M 3/42* | (2006.01) | |
| *H04W 4/02* | (2009.01) | |
| *H04W 40/24* | (2009.01) | |
| *G06Q 30/02* | (2012.01) | |
| *H04W 4/00* | (2009.01) | |
| *H04M 7/00* | (2006.01) | |

(52) U.S. Cl.
CPC ............ *H04W 4/043* (2013.01); *G06N 7/005* (2013.01); *G06Q 30/0261* (2013.01); *G06Q 30/0269* (2013.01); *H04M 3/42348* (2013.01); *H04W 4/028* (2013.01); *H04W 40/244* (2013.01); *H04M 7/0021* (2013.01); *H04W 4/008* (2013.01)

(58) Field of Classification Search
CPC ..... H04W 4/042; H04W 4/008; H04W 4/043; H04M 7/0021; G06N 7/005
USPC ...................... 455/456.3, 456.1, 414.1, 422.1
See application file for complete search history.

(56) References Cited

U.S. PATENT DOCUMENTS

| | | | |
|---|---|---|---|
| 8,618,932 B2* | 12/2013 | Maia ........................ | G01S 13/08 340/539.13 |
| 2011/0045780 A1* | 2/2011 | Ben Hadj Alaya ... | H04W 24/10 455/67.11 |
| 2016/0302042 A1* | 10/2016 | Handly ................. | H04W 4/028 |

* cited by examiner

*Primary Examiner* — Nghi H Ly
(74) *Attorney, Agent, or Firm* — John L Sotomayor (57) ABSTRACT

The present invention is a method and system of locating mobile devices and building a database of the mobile device locations through the interaction of mobile devices with one or more proximity activation systems. The method and system uses beacon proximity activity to refine the location of a beacon and the relative position of one or more mobile devices to the beacon through a multiple activation point distance calculation. As mobile devices come within a pre-determined proximity to a beacon, applications installed on the mobile devices supply a location and identity of the mobile device at the time of activation. The system and method uses numerous activations to refine and report the physical location of the beacon.

20 Claims, 5 Drawing Sheets

PREDICTIVE ANALYTICS UTILIZING PROXIMITY DETERMINATION

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

A beacon is one implementation of an indoor proximity activation system that enables a smart phone or other Bluetooth enabled device to perform actions when in close proximity to a beacon receiver/transmitter.

Predicting the location of a mobile device may be enhanced through the incorporation of historical usage data based upon known usage patterns. Although not 100 percent accurate, metric and analytic information from interaction with one or more beacons may determine where a mobile device may be at a certain period of time. Predictions may facilitate interaction with merchants and others in proximity to the one or more mobile devices for which usage patterns are available.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to multipoint trilateration refers to the mathematical process of determining absolute or relative locations of points by measurement of distances, using the geometry of circles, spheres, or triangles. In the multipoint trilateration, all points associated with a Bluetooth Low Energy (BLE) signal are considered simultaneously, permitting lower overall computational costs.

Reference throughout this document to a beacon refers to a low energy Bluetooth (BLE) device operating as an indoor proximity activation system that transmits packets of data that allow smart devices (such as phones, tablets, computers, handheld devices, game devices, etc.) to be informed when they are in range, and where smart devices are capable of calculating their proximity to the beacon.

In a non-limiting embodiment, this innovation permits communication and action with a client or customer using a device's historical location data to determine the locations/retailers a device is likely to visit and the date/times that device is likely to visit those locations/retailers. Mobile applications do not utilize cookies and for this reason the website advertising model, which relies heavily upon cookie tracking, does not work for mobile advertising. In common practice, cookies track the locations a user visits across the web through the mechanism of placing a small tracking file, or cookie, within a user's computer system. These cookies are usable by the application or web page that placed it within the cookie folder on the user computer file system. In a non-limiting example, because cookies can't track digital locations in mobile apps, we can use physical location like latitude and longitude coordinates or activation by a proximity activation system as a replacement for the tracking pixel recorded in a cookie recited herein to "cookie" where someone visits in the real world.

Utilizing location information gathered from a proximity activation system, such as a beacon, provides highly accurate location information for a mobile device that comes within range of the beacon's signal. In a non-limiting example, when a mobile device detects a Beacon's signal, an application on the mobile device uses the Received Signal Strength Indication (RSSI), which is compared against a pre-set distance to signal strength ratio, to determine proximity to the Beacon as well as the accuracy of its estimation of proximity. The stronger the signal, the more confident the mobile device can be about the proximity of the Beacon. Refining the location of a mobile device may require a location determination system to increase location accuracy.

Beacon signals have largely been used in a real-time context to send a push alert or coupon to a mobile device or smartphone within range of the beacon. While this is a useful application, there is a great deal of information that can be learned about the owner of the mobile device interacting with the beacon that can be used for successful marketing campaigns at future points in time.

One of the greatest challenges in mobile advertising is getting an accurate sense for where people visit in the physical world. The event of a user passing within range of a beacon, so as to activate the beacon and create a "bump", establishes a fixed point of reference for identifying with certainty that a mobile device was in a particular physical location at a specified time. Because most mobile devices are the property of a single individual, these beacon "bumps" assist in identifying and categorizing the habits and preferences of individuals while remaining an anonymous source of information.

In an exemplary embodiment, the location determination system utilizes a point rank calculation to significantly improve the determination of the physical location of the proximity activation system, such as a Beacon, with which the mobile device is interacting. Each mobile device activation creates an event point. In the point rank determination, all event points associated with a BLE signal within a pre-established radius are considered simultaneously as a subset, which allows for lower overall computational costs.

In an exemplary embodiment, data is collected by the Reveal™ SDK or API installed on each mobile device associated with an event point for the proximity activation system, where such an event point may also be an activation point for the interaction with the Reveal™ application server. The Reveal™ application server may collect data about the smart device and may include the access level for the application, such as client, and a Uniform Resource Locator (URL).

Additionally, in an exemplary embodiment, event data may be collected that may consist of specific information captured about each beacon bump, when the proximity activation system is composed of one or more beacons. This data is returned to the mobile location database by the Reveal™ SDK or API on a Reveal™ application server and may include the access level for the application, such as client, and a Uniform Resource Locator (URL).

Utilizing the point rank calculation, the physical location of the indoor proximity activation system, as represented by a Beacon, may be determined with an accuracy of approximately 10 meters or less, with the calculation proceeding more quickly than a calculation performed by strict trilateration, or even multipoint trilateration computations. Upon determining the physical location the application server contacts a location database to determine the type of location in which the detected Beacon is installed. The application server may then contact a geographic or physical place application to determine the type of location associated with the physical location of the Beacon. In a non-limiting example, the application server may contact Google Places Application Programming Interface (API) as one example of a geographic location application. The location type information is then stored in the database table of geographic information. If there is no place type in the Google Places API for the location identified, additional location information may be sought at other location sites that are publicly available to attempt to determine the place type. In a non-limiting example, the application server may receive information back from the Google Places API that the beacon identified at the discovered location is installed in a café.

With this identification, the application server may then build one or more classifications for the beacon at that specific location. In the non-limiting example where the beacon is identified as being installed in a café, the application server may map a café to a classification of Food&Drink>café, which then has the capability to personify any smart device that comes into contact with that classified beacon as a coffee drinker. It should be noted that a beacon may have more than one classification identified with that beacon based upon inferences for the types of retail or other activity that is associated with the place type.

The application server may create a database of classifications for each identified beacon. The classifications may be classified as to the desired relevance, or value, of the persona to the location for purposes of delivering advertising or other information to mobile devices that are, or were recently, in range of the beacon. In a non-limiting example, a desirable relevance would be a mobile device classified as having a history of purchasing goods or services an advertiser provides to buyers. It would be a waste of time to present an advertisement for fishing lures to mobile devices that come within range of a beacon installed in a café. However, it could be highly effective to present a coupon for a special promotion on coffee drinks to mobile devices classified as coffee drinkers that have come within range of that same beacon. The application server may collect click information for all ads or other informational messages that are presented to mobile devices. This information permits the application server to provide metrics on the click-through of such ads by mobile devices both outside and within range of the beacon. Click-through data, and other metric data, may be used in analyses to show the effectiveness of various types of ads and messages presented by beacons based upon their physical location and location type, providing a new range of analytic information for mobile devices that are within range of the identified beacon.

Attributing a mobile advertising spend to in-store foot traffic is impossible without highly accurate physical location data for a mobile device. Beacon recognition can address the need for creating highly accurate physical location identification of mobile devices. The application server may create a global database of precise beacon locations, which enables two distinct forms of highly targeted advertising capabilities. With a highly accurate physical location for each mobile device, mobile advertising can be directed to particular mobile devices within proximity of a beacon that is most readily associated with the focus of the mobile ad. The application server can provide highly accurate feedback on ads and information delivered a result of proximity to a particular beacon by tracking click through data from all mobile devices in range of the beacon. Additionally, the personified mobile devices may be used to build mobile audience categories that a publisher can leverage to sell targeted ads that garner high CPMs.

In an embodiment, demographic information may be combined with collected data from smart mobile devices. This information may include gender, income range, education level, age range, and additional demographic information available from public sources. The public sources consulted may include, but are not limited to, US Bureau of the Census, automotive data, TV viewing data, purchase data, and grocery store shopping data. In a non-limiting example, personas may be established for an age range, profession, gender, shopping characteristic, store preference, political affiliation, home location, and work location, among other characteristics, to associate the mobile device with an owner or user having one or more particular personas. The demographic data may provide the creation of new personas or may strengthen existing personas, enhancing the targeting and placement of advertising and informational messages and communications.

In an exemplary embodiment, the Reveal™ application server may utilize the location information derived from the point rank analysis in combination with a logged recorded history for the mobile device to create one or more predictive recommendations for subscribers and users of the Reveal™ system. In this exemplary embodiment, the application server may have an installed module that analyzes the beacon activations geographical location in relation to the time of day to determine activities associated with a physical path over time. Multiple personas are associated with each mobile device that activates particular beacons. An analysis of the path taken by a mobile device may be associated with one or more personas that have been established for that particular mobile device. In this fashion, the analysis result may present an ability to predict, for a given time of day and path taken, where the mobile device is likely to be located next. In looking forward, the application server may set a check point to determine if the next beacon activation for the particular mobile device is associated with the beacon that would be encountered next for the time of day and predicted pathway. With this feedback and verification signal, the application server may communicate a particular message, ad, or other signal to the relevant persona or personas associated with the mobile device.

In a non-limiting example, when a mobile device moves along a path of beacons that are associated with shopping (mall stores, grocery stores, drug stores, etc) in the evening, the application server may be able to identify and associate a persona of a working mother with the mobile device. With this persona identification, the application server may look forward to one or more beacons installed in shopping locations that would be likely to be visited by a working mother and transmit a signal to the shopping location associated with the shopping location. The signal may present an opportunity for the shopping location to prospectively authorize a message, ad, or other signal to the mobile device when that mobile device activates the expected beacon. In this manner, predictive message placement may take place on a pre-determined, real time basis, or in an ad hoc manner to take advantage of the mobile device entering the shopping establishment.

In this non-limiting example, the application server may be able to provide, for a small fee or other consideration, some information on household size for that persona on that mobile device. Additionally, the application server may be able to provide predictive information on the likely purchases at any particular shopping location to permit the generation of "instant savings" coupons, special deal ads, or informational messages tailored for the persona on that mobile device. The shopping location contacted may instead choose to opt out of transmitting any information to the persona located on the mobile device unless a trigger event has occurred. Trigger events are those events that are established by a shopping location to set the conditions that must exist to permit the application server to issue coupons, ads, informational messages, or other signals to one or more personas located on the mobile device.

Predicting the path a mobile device may follow is not relegated to a single persona on a mobile device. Because multiple personas may be defined for a single mobile device, a predicted path for each of the personas associated with the mobile device may be prepared by the application server. The application server may then present a coupon, ad, informational message, or other signal to any persona in a mobile device regardless of the path the mobile device moves along. Predicting numerous paths presents multiple opportunities to prepare and transmit information to a mobile device regardless of the next step in the path being traveled and based upon the personas defined for the mobile device.

In an alternative exemplary embodiment, characterizing one or more personas associated with a mobile device may be performed based upon the path of beacon activations over a span of time. This characterization may be an indicator of what type or specific application may be downloaded to the mobile device. In a non-limiting example, if a persona is characterized based upon the mobile device activating beacons associated with games, comic books, costume shops, and other establishments catering to a persona that is interested in gaming, the application server may predict that the latest game application or update may be offered to that mobile device. The application server could then send application information to the mobile device. Additionally, when particular groups of applications are commonly downloaded either in a group or serially one after another, the server application may offer information on all of the applications as a group for purchase and download to the mobile device. The application server may develop clusters of commonality in application downloads. The application server may offer information, ads, or downloads of these clusters of applications to personas that have similar characteristics based upon the analysis of the path of beacon activations of the mobile devices associated with those personas. This process may foster application sales to prospective customers that are pre-qualified based upon the history of mobile device usage and the personas developed for the mobile devices.

In an embodiment, the Reveal™ application server may integrate with a plurality of advertising servers. This direct communication pathway will permit tracking and management of every advertising and informational message delivered to every device within the sphere of the advertising server. The direct integration with advertising servers may strengthen attribution reporting and permit stronger correlations between delivered messages and mobile devices. This data may be collected in one or more Reveal™ and/or advertising server databases and managed by one or more Reveal™ analytics management processes.

In an embodiment, the Reveal™ application server may evaluate latitude and longitude data provided by a GPS process associated with each mobile device on which a Reveal™ enabled application is installed. This data is provided upon the startup of the application. The data may be analyzed and utilized to build known locations, such as home, work, and other locations for the mobile device, and additional persona information based upon location history. This information will be stored upon and managed by one or more Reveal™ application servers.

In an additional embodiment, a Reveal™ application server may utilize metrics and other collected data to evaluate all known locations, personas, and historical behaviors to create analytics for all mobile devices known to the system. This analytic information may be used to create predictive advertising for the mobile devices. In this process, advertising data may be targeted for delivery to a mobile device based upon predictions of future intent for each mobile device and personas associated with mobile devices.

Figure 1:
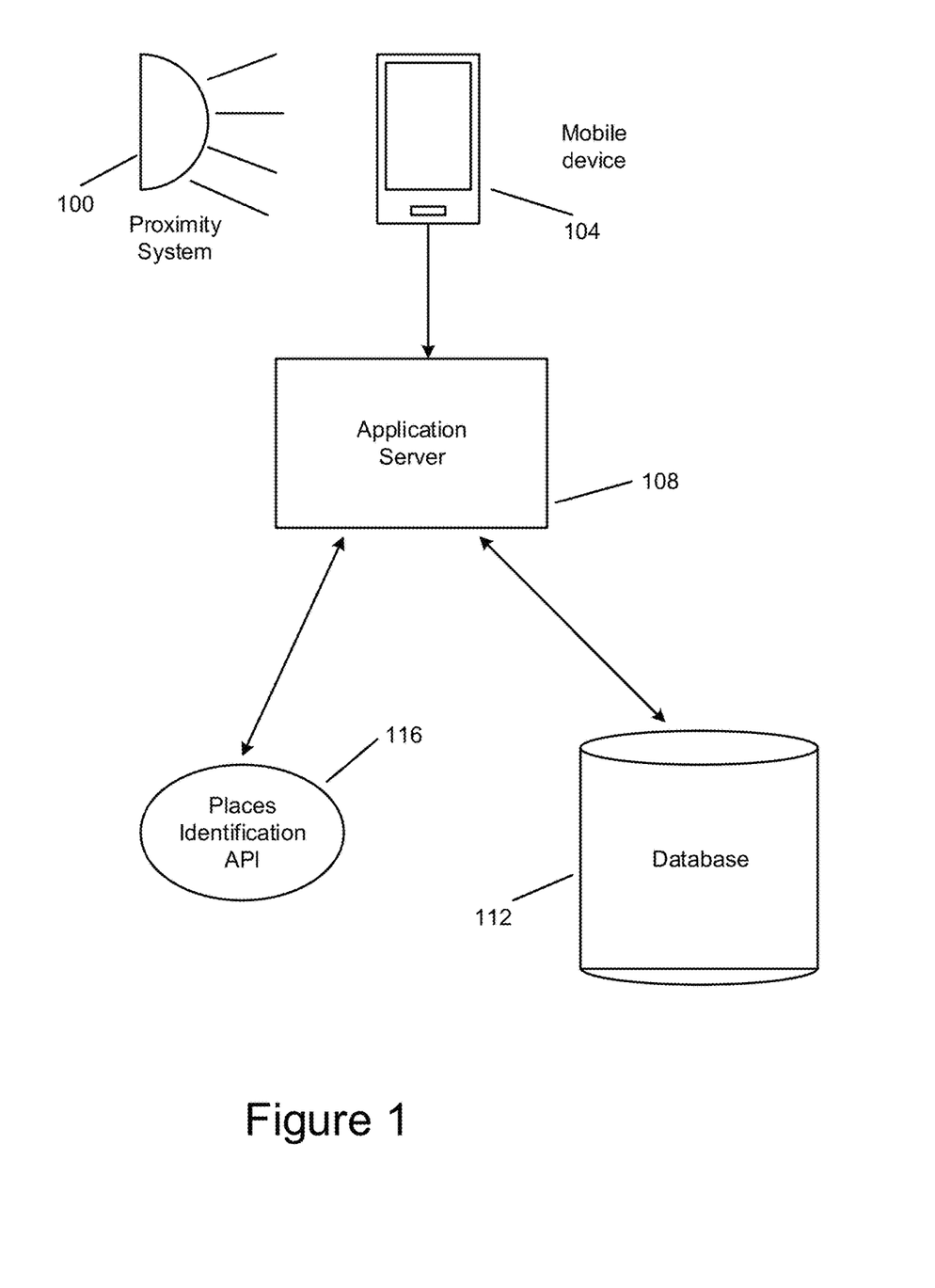
FIG. 1 is a system diagram for an exemplary system operation consistent with certain embodiments of the present invention.

Turning now to FIG. 1, this figure presents a system diagram for an exemplary system operation consistent with certain embodiments of the present invention. An indoor proximity activation system 100, such as a beacon, may be installed within physical locations such as stores, sporting areas, malls, parks, cafes and restaurants, or any other physical location where information may be transmitted to a mobile device 104. A beacon bump is an activation indication from the indoor proximity activation system 100 that is transmitted to the application server 108 when a mobile device upon which the Reveal™ SDK has been installed. When a beacon bump is detected, the beacon information, containing at least the uuid, major, minor, and name fields, is transmitted to the Reveal™ application server 108. The application server 108 stores the transmitted beacon information in a relational database 112 on the application server 108, either as a new entry into a beacon data table or as an update to an entry already stored in the beacon data table. The application server 108 also adds geographical data, the latitude and longitude, for the beacon into a data table. Additionally data regarding the mobile device manufacturer, operating system type and other metrics are stored in a separate data table on the application server 108.

After the application server 108 has completed a refinement calculation for the geographical location of the indoor proximity activation system 100, the application server 108 may seek to identify the location in which the indoor proximity activation system 100 has been installed. In a non-limiting example, the application server 108 may contact a places identification service 116, such as Google Places, through the API and present the physical location information to check the type of place in which the indoor proximity activation system 100 is operating. Once the type of place is returned from the places identification API 116, this information is stored in the relational database 112 and associated with that particular beacon.

Upon the conclusion of this operation, the Reveal™ system has a table of beacon information and associated data regarding the number of mobile device activations near the indoor proximity activation system 100, the type of place in which the indoor proximity activation system 100 is installed, and the precise physical location of the indoor proximity activation system 100 within that location.

Figure 2:
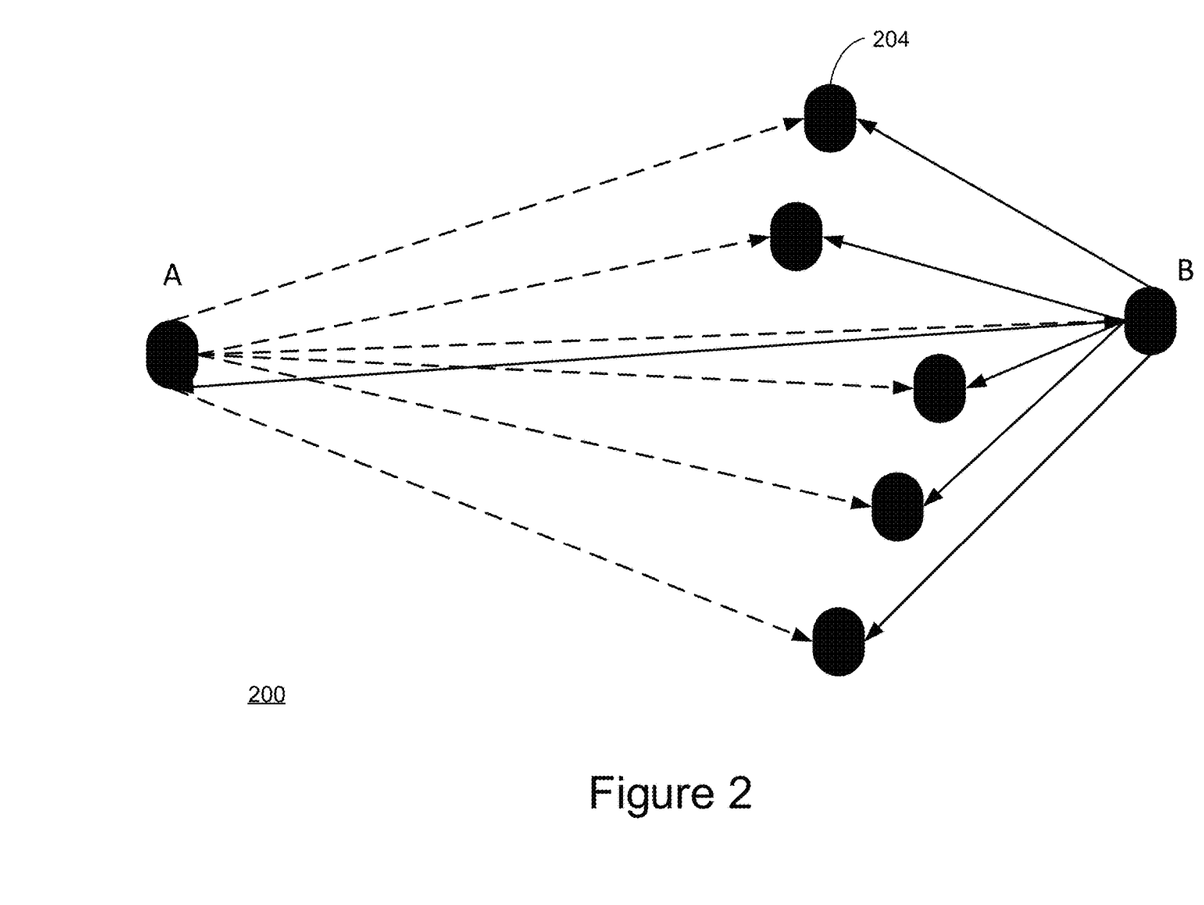
FIG. 2 is a representative view of point distance vectors for event points consistent with certain embodiments of the present invention.

Turning to FIG. 2, this figure presents a representative view of point distance vectors for activation points consistent with certain embodiments of the present invention. After a pre-set number of activations, or bumps, have been collected by the indoor proximity activation system, a calculation is performed within the application server to refine the geographical location of the indoor proximity activation system. In this non-limiting example, the indoor proximity activation system is a beacon supplying a BLE signal. The accuracy of the geographical location of a beacon is based upon the latitude and longitude of the beacon and the proximity of the mobile device to the beacon. However, the accuracy of the estimation of proximity, and the determination of proximity itself, are highly dependent upon the distance from the beacon to the mobile device, whether the beacon is inside or outside of a physical structure, whether the mobile device is in a location such as a backpack, purse, or pocket, and what obstructions might be between the mobile device and the beacon, including the physical body of the person holding the mobile device. For these reasons, a precise location for a beacon in relation to a mobile device and the confidence in the accuracy of the relative position of the beacon to the mobile device may be highly inaccurate.

The application server, therefore, may use a point rank calculation to refine the precise location of the beacon, based upon the pre-set number of beacon bumps transmitted to the application server for that beacon. As seen on the map 200, each beacon bump is represented by an activation area in which the activation area is a circle with the mobile device at the center and the diameter of the circle directly proportional to the received signal strength from the mobile device. In a non-limiting example, the distance vectors for event point A and event point B in relation to all other activation event points 204 is presented.

The average distance of a particular event point A to all other event points within a predetermined radius of event point A is calculated. Any centrality measure may be used to determine average distance for all points, such as the mean, median, or any preferred centrality measure calculation. In a non-limiting example, the mean is used because of the speed of calculation for this centrality measure, but the median, standard deviation, or some other centrality measure could be used in special applications.

Figure 3:
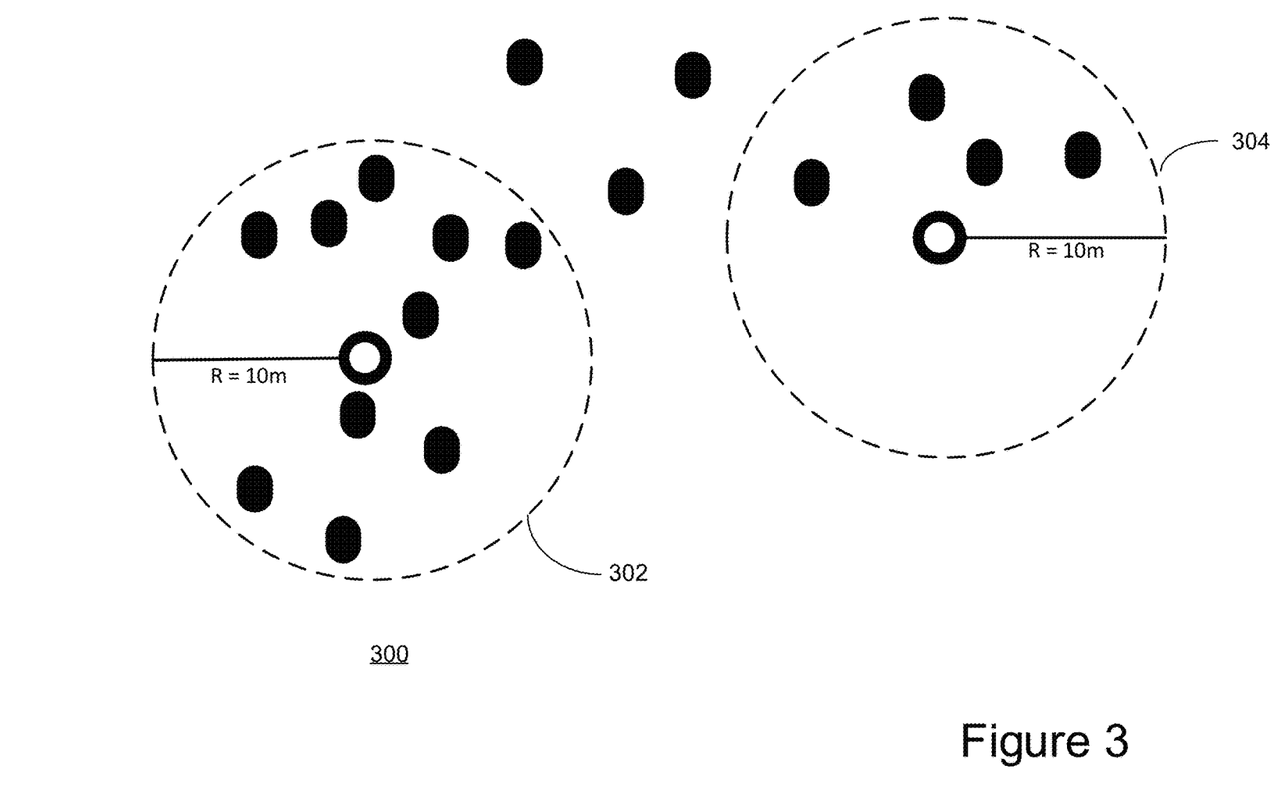
FIG. 3 is a representative view of the calculation of point ranks for event points consistent with certain embodiments of the present invention.

Turning to FIG. 3, this figure presents a representative view of the calculation of point ranks for event points consistent with certain embodiments of the present invention. After creating a subset list of events for a particular proximity activation system of interest, the system then calculates the distance between each of the event points in the subset list. Table 1 presents a view of the data for each event point and the association of the event point to all other event points within the pre-determined radius of the event point for which the event point calculation is performed.

TABLE 1

| X-distance | X1 | X2 | X3 | ... | Xn |
|---|---|---|---|---|---|
| X1 | 0 | $d_{12}$ | $d_{13}$ | | $d_{1n}$ |
| X2 | $d_{21}$ | 0 | $d_{23}$ | | $d_{2n}$ |
| X3 | $d_{31}$ | $d_{32}$ | 0 | | $d_{3n}$ |
| ... | | | | 0 | |
| Xn | $d_{n1}$ | $d_{n2}$ | $d_{n3}$ | | 0 |

Upon the completion of the calculation of all distances for each event point in the subset list, the system assigns a rank for each event point. The rank is computed by counting the number of other points that are within the pre-established radius of each event point. In this calculation, if a first event point, event point A 302, has 10 other event points determined to be within the pre-established radius of event point A 302, event point A 302 will have a point rank of 10. If a second event point, event point B 304, has 10 other event points determined to be within the pre-established radius of event point B 304, event point B 304 has a point rank of 10. The final estimated location of the proximity activation system, again, such as a Beacon, is the event point with the highest calculated point rank.

Figure 4:
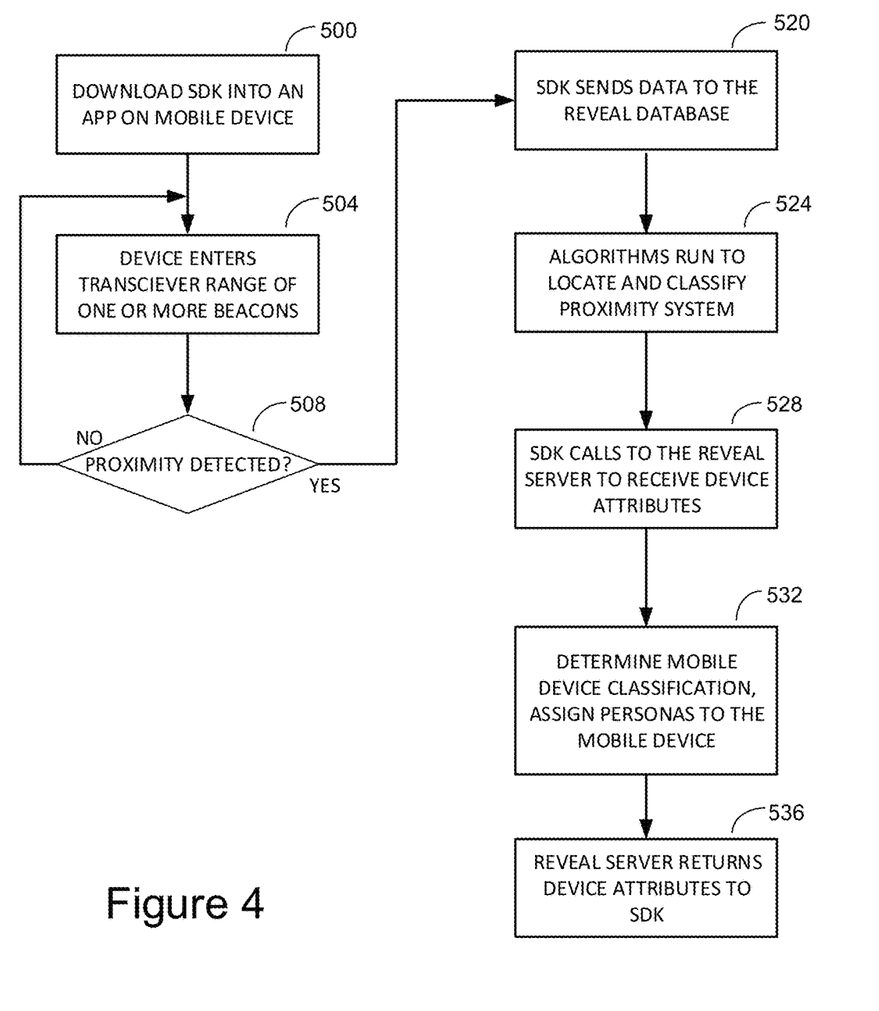
FIG. 4 is a process flow for the interaction of a mobile device with proximity activation system associated analytic data consistent with certain embodiments of the present invention.

Turning to FIG. 4, this figure presents a process flow for the delivery of information to a mobile device located near a located beacon consistent with certain embodiments of the present invention. In this exemplary embodiment, the process is activated when a mobile device that has previously downloaded the Reveal™ SDK or an API associated with the SDK 500 enters into the signal range of a proximity activation system, such as a beacon 504. If the mobile device detects the beacon 508, it causes an activation of the beacon referred to in a non-limiting example as a "bump". If the mobile device does not detect the beacon 508, the mobile device may not have a properly installed SDK or API, the range may be too great for detection to occur, the mobile device may be moving too rapidly past the beacon for detection, or the beacon may be malfunctioning. In this occurrence, the mobile device will wait until it enters the range of another proximity activation system represented by a beacon. If the Reveal™ application is active, the SDK transmits a notification of the beacon bump, and causes the application SDK installed on the mobile device to send a record of the beacon bump to the Reveal™ application server 520.

Upon receipt of the information from the mobile device, the beacon information is added to the Reveal™ database in the beacon table. The record of the beacon bump contains information about the beacon (uuid, major, minor, name, and like fields). The beacon table in the database may add an additional record for a new beacon, if this beacon has not yet been encountered, or may update an existing beacon record. Additionally, the application server may update the geographic data for the beacon by updating or adding to the BeaconClass table, which contains geographic data for all beacons encountered by mobile devices that have the Reveal™ SDK installed in any of a number of widely available mobile application that has been downloaded to the mobile device. The application server also updates the database with physical information about the mobile device such as manufacturer, application type installed, operating system, and similar device information.

The application server then checks the number of beacon bumps that have been received for a given beacon to determine if the number of beacon bumps is equal to or greater than a pre-set threshold. If the threshold has not been met, the application server may continue to collect beacon bumps until that number has been met. It is to be understood that the threshold number may be any number that may be used as a reasonable number to collect prior to continuing the process for physical location optimization. If the threshold has been met, the Reveal™ application server may then begin to process the beacon location information collected with each beacon bump.

At 524, the application server uses a multipoint trilateration calculation as described previously to refine the location of the beacon, and performs additional classification operations based upon the calculated physical location. The application server process generally provides a physical location for the beacon that is accurate to within 10 meters. Upon deriving the physical location for the beacon, the application server then identifies the type of location in which the beacon has been installed and stores that information in the database in association with the beacon information. Once the place type has been determined, the location is mapped to a classification, such as a café, sports area, store, mall, park, or the like. The SDK on the mobile device requests attributes that have been determined for the mobile device 528. The application server may determine the mobile device attributes to be assigned to the mobile device based upon physical location and information contained in the database about the mobile device. In a non-limiting example, the determination of a home zip code may be calculated for a mobile device. All startup events logged for a mobile device may be filtered to those occurring between the hours of 10 pm and 7:30 am, the hours when most individuals are in their domicile and use the multipoint trilateration calculation to provide a location of the domicile associated with that mobile device. Using this determined physical location, a zip code may be determined from publicly available US census data. In an alternative non-limiting example, the gender of the mobile device user may be ascertained with a reasonable accuracy. The application server may calculate the distance the mobile device travels each day, combine this information with the recorded beacon bumps and the types of establishments associated with each beacon bump. Using this information, as well as possible text message survey information, a determination as to gender may be made that is reasonably accurate.

Each location may be mapped to more than one classification, and a determination may be made as to the relative value of each type of classification associated with a location. This information is stored into the database for later use in metrics, analytics, and the determination of service offerings 532.

The Reveal™ server returns the requested attributes for the mobile device to the SDK associated with the mobile device 536. The mobile device attributes, such as the mobile device classification and assigned personas, may be used to deliver ads or information to device personas based upon a hierarchical listing of personas. In a non-limiting example, a high value persona is one for which there may be active advertisers willing to pay a premium to present their ads or information to a location that has the persona type for which their goods are appropriate. Ranking the value of personas for each location permits the Reveal™ application server to deliver ads and information to high value targets on a priority basis.

Figure 5:
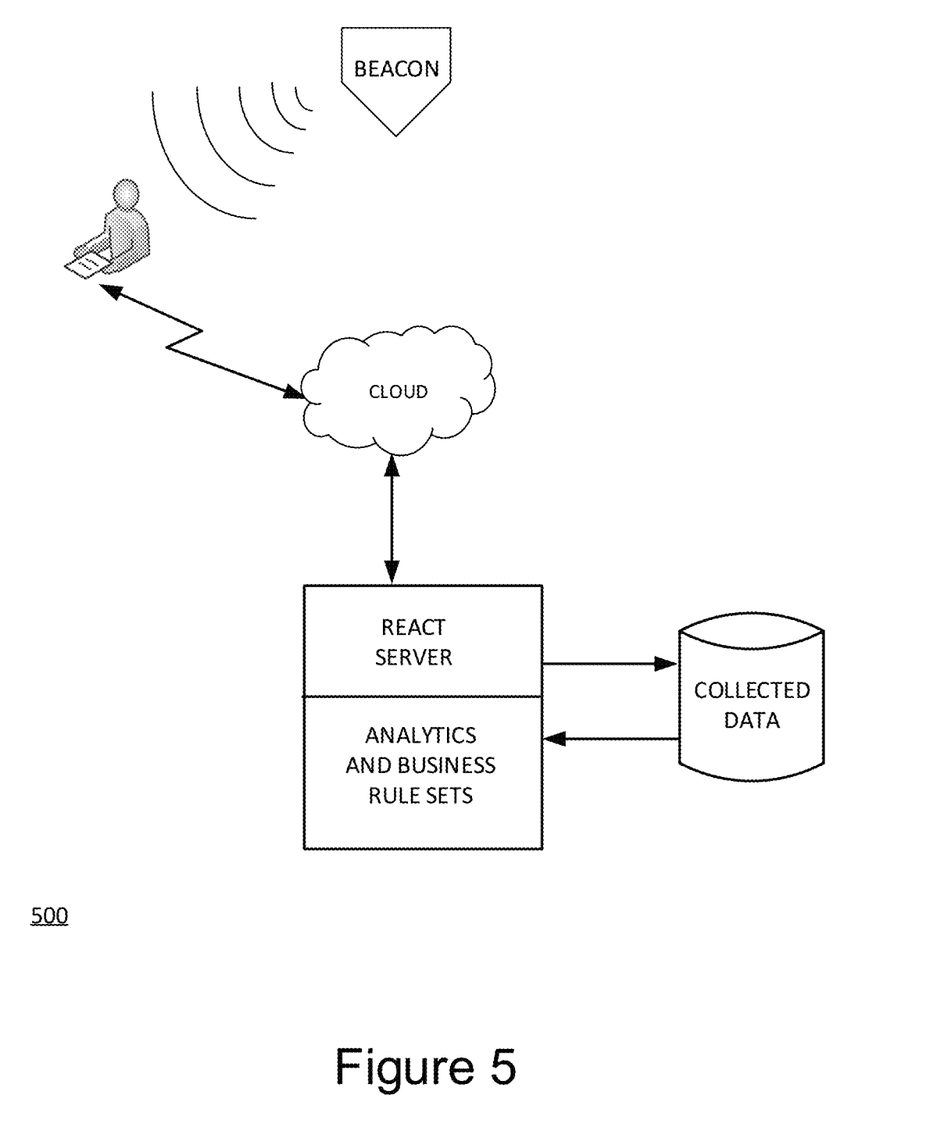
FIG. 5 is a system diagram for an exemplary analytics determination operation consistent with certain embodiments of the present invention.

FIG. 5 is a system diagram for an exemplary analytics determination operation consistent with certain embodiments of the present invention 600. In a non-limiting example, consider a beacon that is installed in a department within a mall. When a user activates that beacon, it can be determined that the user visited the department store and also that the user visited a mall, particularly that mall. If the activation takes place during business hours on a weekday, this timing increases the probability that the device owner does not work outside the home, or is a student.

Including the information that the beacon bump has occurred on a school day, the rule analysis reduces the likelihood of an owner of the mobile device being a student and increases the probability that the owner is female. This probability increase is due to the fact that the majority of people not working outside the home are female. If this even occurs just once, the confidence in these predictions is weak. However, as the system monitors this particular beacon, and tens of thousands of other beacons, the system can use the collected data to create a highly accurate set of profiles about a device owner and the real world behaviors associated with the device owner. These behaviors may then be considered in marketing campaigns to maximize the effectiveness of the advertising campaigns through highly accurate, targeted, time frame appropriate ad delivery.

In a non-limiting example, if a person routinely shops for groceries one time per week in the morning, then an optimal time can be determined to deliver an ad to the device associated with this person. If a user visits a sporting venue three times during the course of the sports season, they can be considered a fan, but not a season ticket holder, and a marketing campaign can be designed to upsell or attract this user to buy a ticket for one or more additional games.

In this exemplary embodiment, having a detailed map of what beacons a mobile device bumps into, including the predictions of what beacons the mobile device will most likely bump into next based upon past behaviors, the system may develop a guideline for which retail locations might be most attractive to the user associated with the mobile device. This guideline, or map, may focus principally on those retail locations that the mobile device has historically been attracted to, but which the mobile device, and by associated its owner, has not yet already visited. This analysis may be performed through a set of business rules, predictive modeling techniques such as association rules mining, path analysis, or similarity analysis of one user to another. The result of these analyses provide the system with the ability to communicate which retail location recommendations would be best received by the mobile device owner.

In an exemplary embodiment, the system may perform association rule mining to determine common sets of beacon bumps, or activations, for sets of mobile devices. In this methodology, devices are analyzed for which beacons are bumped, and bumped by the same device. An Apriori-type algorithm is used to find common sets of beacon bumps that meet a threshold from the many millions of transactional events in the event database. An Apriori algorithm is an algorithm for frequent item set mining and association rule learning over transactional databases. It proceeds by identifying the frequent individual items in the database and extending them to larger and larger item sets as long as those item sets appear sufficiently often in the database. The frequent item sets determined by Apriori can be used to determine association rules which highlight general trends in the database.

While certain illustrative embodiments have been described, it is evident that many alternatives, modifications, permutations and variations will become apparent to those skilled in the art in light of the foregoing description.

What is claimed is:

1. A method of communication delivery to mobile devices, comprising:
    capturing a plurality of mobile device activations by a proximity activation system;
    determining location of the proximity activation system activated by a pre-determined number of mobile device activations;
    associating the proximity activation system location with a physical address or location;
    associating one or more device-specific, application and server created personas through an analysis of collected metrics with each mobile device that activated the proximity activation system;
    utilizing location determination in combination with collected metrics to create predictive recommendations; and
    delivering communications targeted to one or more device-specific, application and server created personas associated with each mobile device.

2. The method of claim 1, further comprising refining the proximity activation system location by determining the mobile device activation having the highest rank and associating the proximity activation system with the geographic location of said mobile device activation.

3. The method of claim 1, further comprising the creation of one or more personas to be installed on the mobile device.

4. The method of claim 3, where each persona may be associated with any one of age range, profession, gender, shopping characteristic, store preference, political affiliation, home location, and work location.

5. The method of claim 3, where a mobile device has a plurality of installed personas.

6. The method of claim 1, where a persona may be updated based upon the analysis of collected metrics for a particular mobile device.

7. The method of claim 1, where the location of a physical address includes the location of a physical address for each proximity activation system a mobile device activates within a pre-determined period of time.

8. The method of claim 7, where the location of physical addresses are analyzed to track the mobile device and create a tracking path for the mobile device.

9. The method of claim 8, further comprising analyzing the tracking path to predict a next proximity activation system that will be in range of the mobile device.

10. The method of claim 9, further comprising transmitting the physical location of the predicted next proximity activation system to the mobile device.

11. A system of communication delivery to mobile devices, comprising:
    a server having a processor in wireless communication with a plurality of mobile devices;
    capturing a plurality of mobile device activations by a proximity activation system;
    the server determining location of the proximity activation system activated by a pre-determined number of mobile device activations;
    associating the proximity activation system location with a physical address or location;
    associating one or more device-specific, application and server created personas through an analysis of collected metrics with each mobile device that activated the proximity activation system;
    utilizing location determination in combination with collected metrics in creating predictive recommendations; and
    delivering communications from the server to the plurality of mobile devices targeted to one or more device-specific, application and server created personas associated with each mobile device.

12. The system of claim 11, further comprising refining the proximity activation system location by determining the mobile device activation having the highest rank and associating the proximity activation system with the geographic location of said mobile device activation.

13. The system of claim 11, further comprising the creation of one or more personas to be installed on the mobile device.

14. The system of claim 13, where each persona may be associated with any one of age range, profession, gender, shopping characteristic, store preference, political affiliation, home location, and work location.

15. The system of claim 13, where a mobile device has a plurality of installed personas.

16. The system of claim 11, where a persona may be updated based upon the analysis of collected metrics for a particular mobile device.

17. The system of claim 11, where the location of a physical address includes the location of a physical address for each proximity activation system a mobile device activates within a pre-determined period of time.

18. The system of claim 17, where the location of physical addresses are analyzed to track the mobile device and create a tracking path for the mobile device.

19. The system of claim 18, further comprising analyzing the tracking path to predict a next proximity activation system that will be in range of the mobile device.

20. The system of claim 19, further comprising transmitting the physical location of the predicted next proximity activation system to the mobile device.

* * * * *